United States Patent
Mohler

(10) Patent No.: US 6,601,173 B1
(45) Date of Patent: Jul. 29, 2003

(54) MULTI-USER INTERNET ACCESS AND SECURITY SYSTEM

(75) Inventor: David S. Mohler, Arvada, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/348,593

(22) Filed: Jul. 6, 1999

(51) Int. Cl.$^7$ ......................... G06F 13/00; G06F 15/173

(52) U.S. Cl. ........................ 713/201; 713/200; 709/245; 707/10

(58) Field of Search ................................. 713/201, 202; 707/10, 102; 709/203, 217, 218, 219, 245, 223, 229

(56) References Cited

U.S. PATENT DOCUMENTS 6,195,707 B1 * 2/2001 Minh .......................... 709/245
6,208,991 B1 * 3/2001 French et al. .................. 707/10
6,278,449 B1 * 8/2001 Sugiarto et al. ............ 345/826

* cited by examiner

Primary Examiner—Ly V. Hua
(74) Attorney, Agent, or Firm—Patton Boggs LLP

(57) ABSTRACT

The multi-user Internet access and security system which automates the management of the favorites category of bookmarks and also provides a password protection capability for all of the bookmarks that are stored by the computer system for each of the users of the computer system. In particular, the favorites category of bookmarks for each user is cache managed with the infrequently used bookmarks being cataloged as "expired" and then migrated to a "former favorites" category where they remain until the user deletes them or the system optionally automatically deletes them after a further predetermined period of inactivity. In this manner, the user can populate the favorites feature of the bookmarks, but does not have to further address the usefulness of these stored bookmarks, since the computer system automatically manages the cleanup of former favorite bookmarks. The present multi-user Internet access and security system also provides password protection of the individual user's bookmarks to prevent the other users from accessing the user's bookmarks. This is advantageous when the bookmarks are provisioned with login and password data to automate the user's access to a particular WEB site. This capability is especially relevant where the login and password script varies for the plurality of bookmarks that are stored for a particular user. The user then does not have to remember the various access scripts, since they are programmed into the computer system. The user, having already been password admitted, simply clicks on the desired bookmark and the computer system automatically access the identified Internet WEB site without the need for further user input.

16 Claims, 3 Drawing Sheets

MULTI-USER INTERNET ACCESS AND SECURITY SYSTEM

FIELD OF THE INVENTION

This invention relates to the bookmark function that is part of the standard Internet Browser equipped computer system and, in particular, to a multi-user Internet access and security system that enables a plurality of users to share the bookmarks capability of the Internet Browser on a single computer system without compromising the security of each user's bookmark domain space.

PROBLEM

It is a problem in the field of computer systems to enable a plurality of users to share a computer system without compromising the privacy of each user's files, such as the bookmarks function that is part of the standard Internet Browser equipped computer system. In particular, the present implementation of the bookmark function is overworked and under equipped. Existing computer systems enable the user to organize bookmarks by categories or labels that are selected by the user. For multiple users who share the same computer system, all of the bookmarks not otherwise password protected are both known and available to all users. Thus, most bookmarks are not private or provided with any security. This limitation is also problematic when the bookmarks are provisioned with login and password data to automate the user's access to a particular WEB site. Thereby, all users can access such an Internet Web site. This is especially relevant where the login and password script varies for the plurality of bookmarks that are stored for a particular user. The user then does not have to remember the various access scripts, since they are programmed into the computer system. The plurality of required scripts makes it attractive to provision the bookmarks with login and password scripts in such a configuration, the user simply clicks on the desired bookmark and the computer system automatically access the identified Internet WEB site without the need for further user input. Therefore, typically all bookmarks are both known and available to all users of the computer system, which is a problem.

Another bookmark capability is "favorites" which comprises a list of internet WEB sites populated by the user. These favorites entries are indicative of the past Internet WEB site accesses of the user and consist of the URL of the particular WEB site. The favorites list is a static listing in the presently available bookmarks features and the entries remain therein in perpetuity or until the user manually deletes the entry. The present utility of the bookmark in the favorites category, as evidenced by frequency of use, is never addressed in the existing systems.

SOLUTION

The above-described problems are solved and a technical advance achieved by the present multi-user Internet access and security system which automates the management of the favorites category of bookmarks and also provides a password protection capability for all of the bookmarks that are stored by the computer system for each of the users of the computer system. In particular, the favorites category of bookmarks for each user is cache managed with the infrequently used bookmarks being cataloged as "expired" and then migrated to a "former favorites" category where they remain until the user deletes them or the system optionally automatically deletes them after a further predetermined period of inactivity. In this manner, the user can populate the favorites feature of the bookmarks, but does not have to further address the usefulness of these stored bookmarks, since the computer system automatically manages the cleanup of former favorite bookmarks.

The present multi-user Internet access and security system also provides password protection of the individual user's bookmarks to prevent the other users from viewing or accessing the user's bookmarks. This is advantageous when the bookmarks are provisioned with login and password data to automate the user's access to a particular WEB site. This capability is especially relevant where the login and password script varies for the plurality of bookmarks that are stored for a particular user. The user then does not have to remember the various access scripts, since they are programmed into the computer system. The user, once password admitted, simply clicks on the desired bookmark and the computer system automatically access the identified Internet WEB site without the need for further user input.

DETAILED DESCRIPTION

Computing Environment in General

Figure 1:
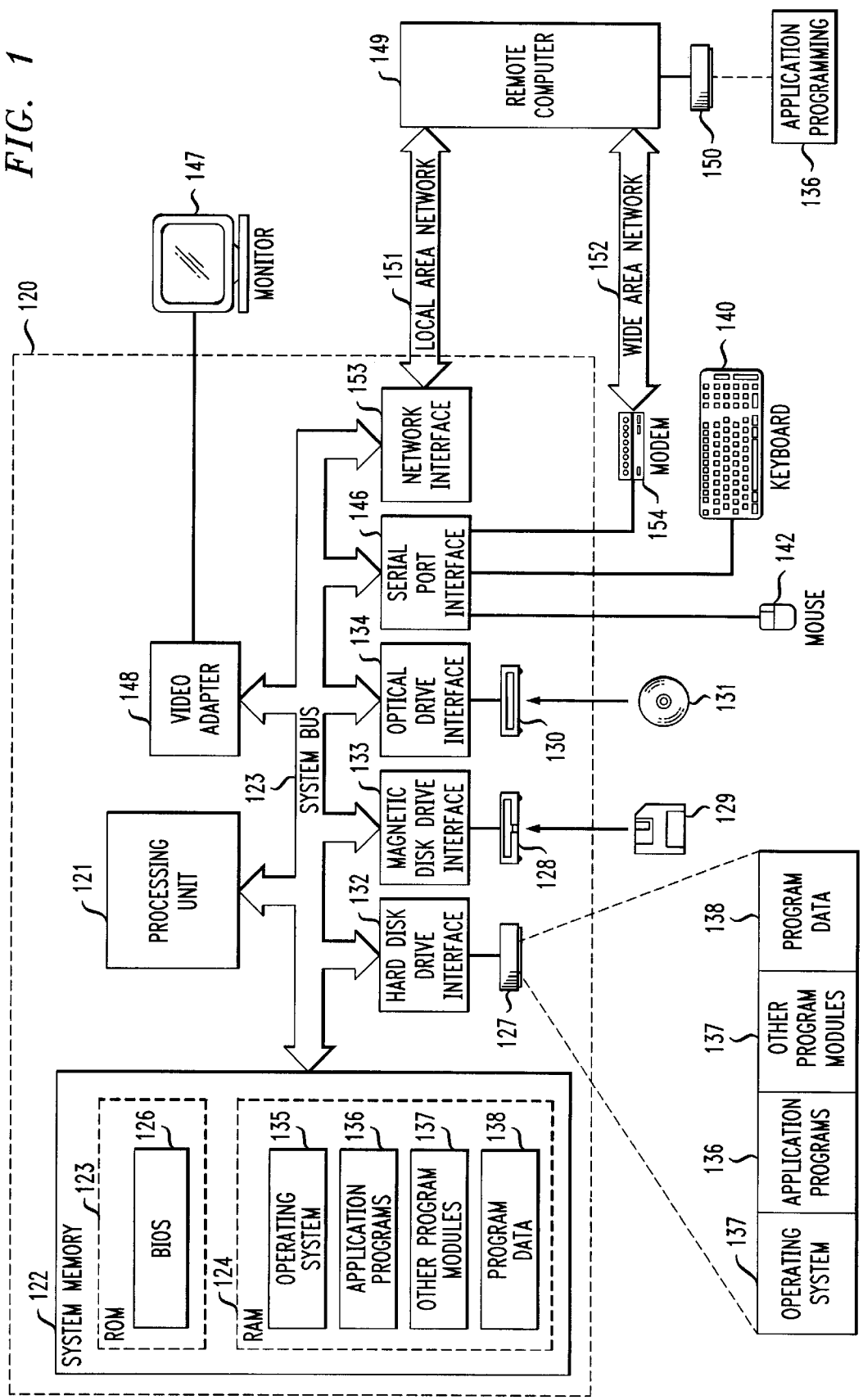
FIG. 1 illustrates in block diagram form the overall architecture of a typical computer system.

FIG. 1 and the following discussion are intended to provide a brief, general description of a suitable computing environment in which the invention may be implemented. Although not required, the invention is described in the general context of computer-executable instructions, such as program modules, being executed by a personal computer. Generally, program modules include routines, programs, objects, components, data structures, etc. that perform particular tasks or implement particular abstract data types. Moreover, those skilled in the art appreciate that the invention may be practiced with other computer system configurations, including hand-held devices, multi-processor systems, microprocessor-based or programmable consumer electronics, network PCS, minicomputers, mainframe computers, and the like.

With reference to FIG. 1, an exemplary system for implementing the invention includes a general purpose computing device in the form of a conventional personal computer 120, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read only memory (ROM) 124 and random access memory (RAM) 125. A basic input/output system 126 (BIOS), containing the basic routines that helps to transfer information between elements within the personal computer 120, such as during start-up, is stored in. ROM 124. The personal computer 120 further includes a hard disk drive 127 for reading from and writing to a hard disk, not shown, a magnetic disk drive 128 for reading from or writing to a removable magnetic disk 129, and an optical disk drive 130 for reading from or writing to a removable optical disk 131 such as a CD ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide nonvolatile storage of computer readable instructions, data structures, program modules and other data for the personal computer 120. Although the exemplary environment described herein employs a hard disk, a removable magnetic disk 129 and a removable optical disk 131, it should be appreciated by those skilled in the art that other types of computer readable media which can store data that is accessible by a computer may also be used in the exemplary operating environment. A number of program modules may be stored on the hard disk, magnetic disk 129, optical disk 131, ROM 124 or RAM 125, including an operating system 135, one or more application programs 136, other program modules 137, and program data 138. A user may enter commands and information into the personal computer 120 through input devices such as a keyboard 140 and pointing device 142. These and other input devices are often connected to the processing unit 121 through a serial port interface 146 that is coupled to the system bus, but may be connected by other interfaces, such as a parallel port, game port or a universal serial bus (USB). A monitor 147 or other type of display device is also connected to the system bus 123 via an interface, such as a video adapter 148. In addition to the monitor, personal computers typically include other peripheral output devices (not shown), such as speakers and printers.

The personal computer 120 operates in a networked environment, such as the Internet, using logical connections to one or more remote computers, such as a remote computer 149. The logical connections depicted in FIG. 1 include a local area network (LAN) 151 and a wide area network (WAN) 152. Such networking environments are commonplace in offices, enterprise-wide computer networks, intranets and the Internet. The personal computer 120 typically includes a modem 154 for establishing communications over the Internet. The modem 154, which may be internal or external, is connected to the system bus 123 via the serial port interface 146.

Bookmark Architecture and Access Process

Figure 2:
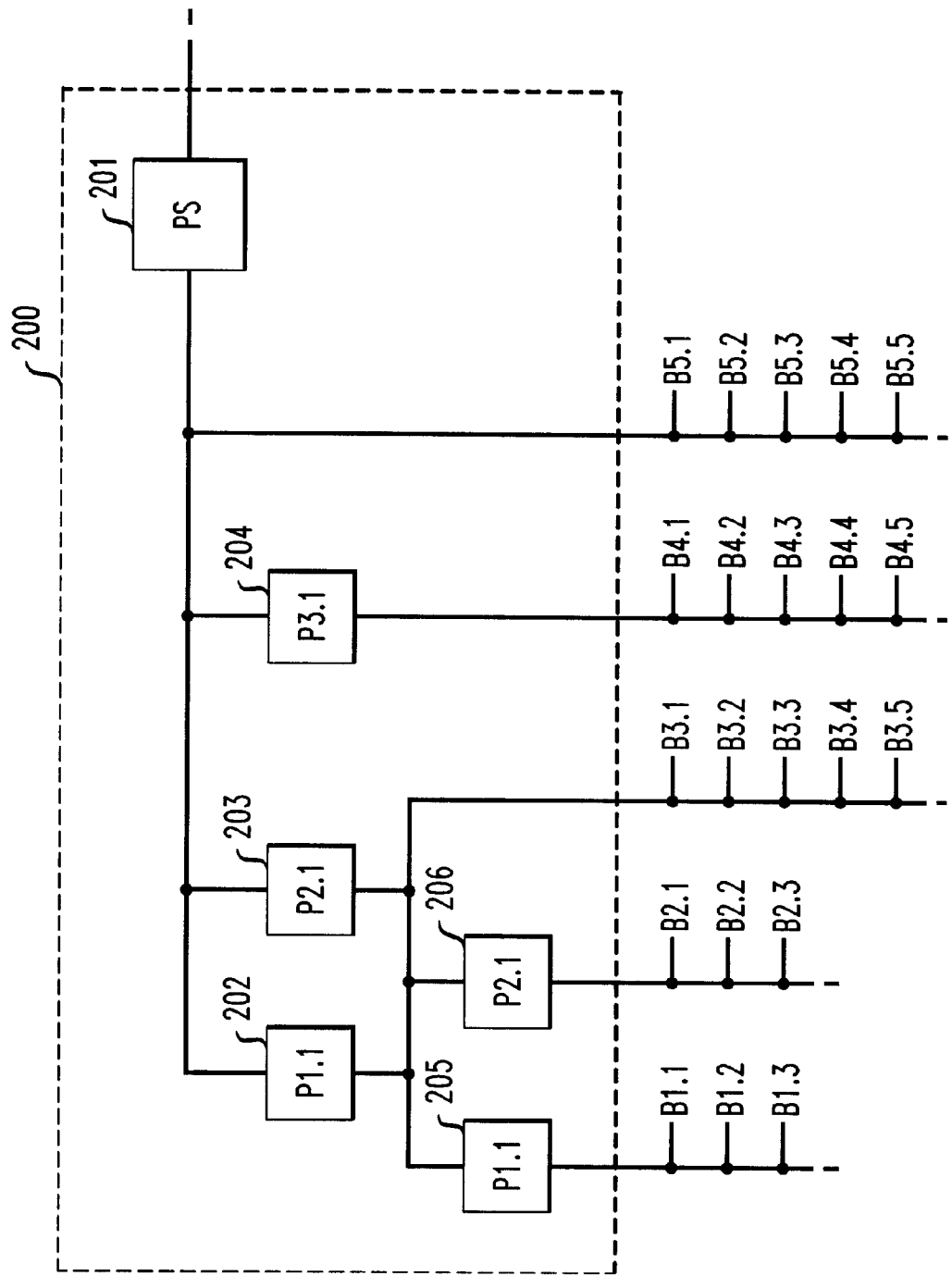
FIG. 2 illustrates in block diagram form the architecture of a typical bookmark system that is managed by the present multi-user Internet access and security system.
Figure 3:
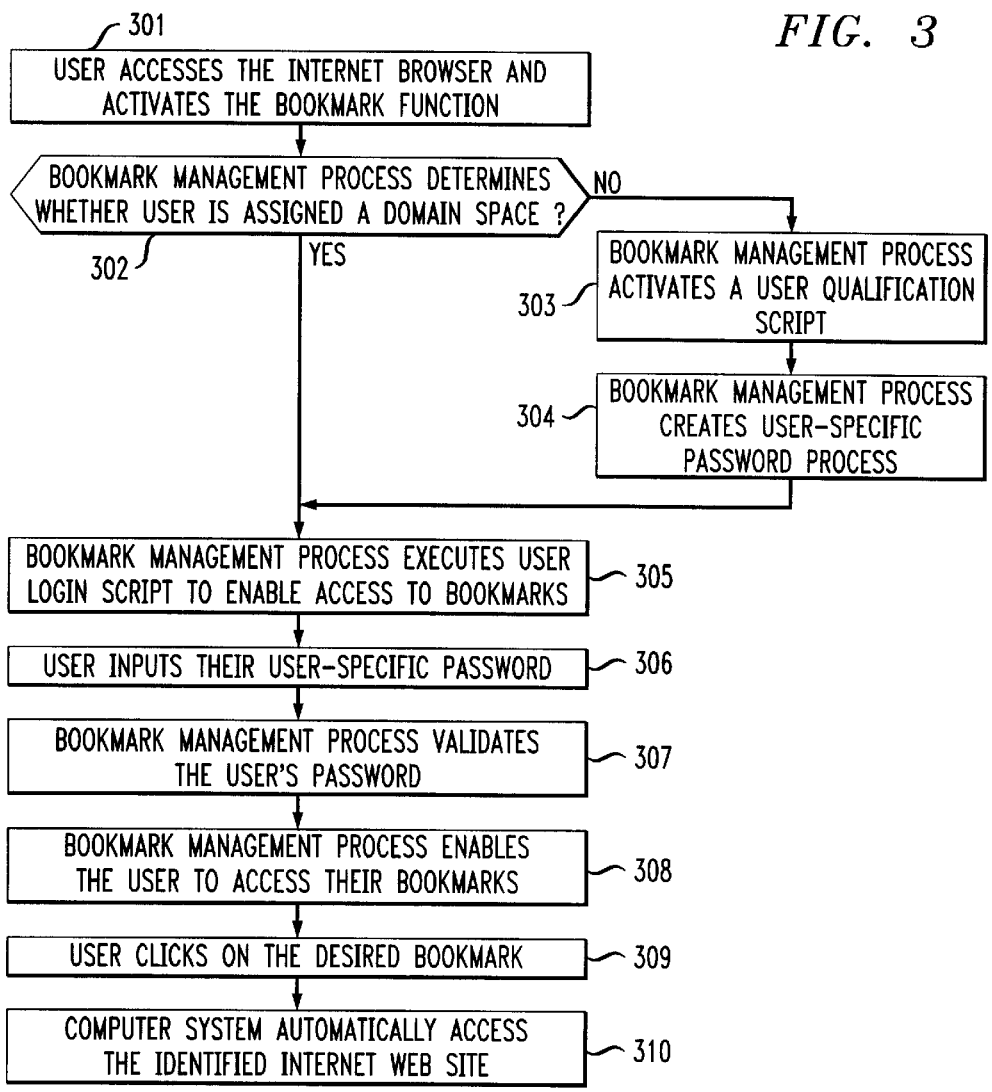
FIGS. 3 and 4 illustrate in flow diagram form the operation of the present multi-user Internet access and security system.
Figure 4:
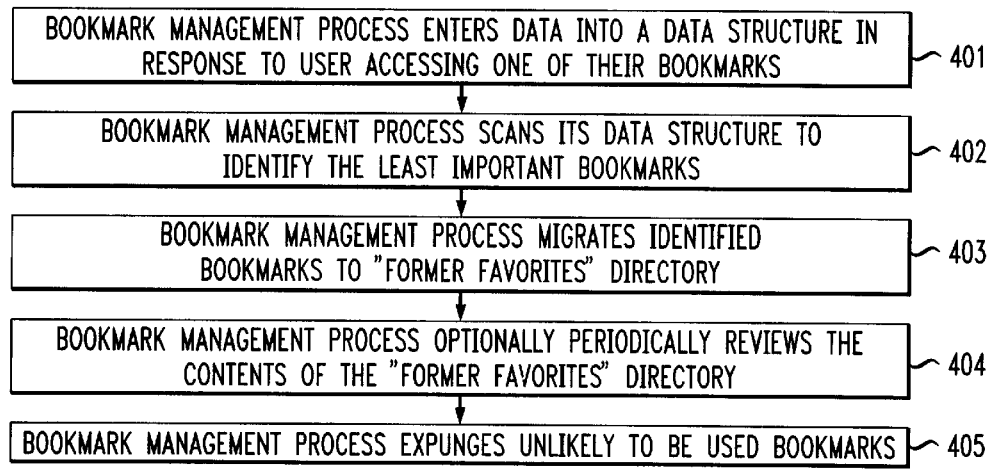

FIG. 2 illustrates in block diagram form the architecture of a typical bookmark system that is managed by the present multi-user Internet access and security system and FIGS. 3 and 4 illustrate in flow diagram form the operation of the present multi-user Internet access and security system. The present embodiment of the multi-user Internet access and security system provides three features: a password protection capability for all of the bookmarks that are stored by the computer system for all of the users of the computer system, privacy from other users knowing what bookmarks are stored, and optional management of the favorites category of bookmarks.

In particular, the present multi-user Internet access and security system provides password protection of the individual user's bookmarks to prevent the other users from viewing or accessing the user's bookmarks. This is advantageous when the bookmarks are provisioned with login and password data to automate the user's access to a particular WEB site. This capability is especially relevant where the login and password script varies for the plurality of bookmarks that are stored for a particular user. The user then does not have to remember the various access scripts, since they are programmed into the computer system. The user, having already been "admitted" to their password protected favorites, simply clicks on the desired bookmark and the computer system automatically access the identified Internet WEB site without the need for further user input. In addition, the favorites category of bookmarks for each user is cache managed with the infrequently used bookmarks being cataloged as "expired" and then migrated to a "former favorites" category where they remain until the user deletes them or the system optionally automatically deletes them after a further predetermined period of inactivity. In this manner, the user can populate the favorites feature of the bookmarks, but does not have to further address the usefulness of these stored bookmarks, since the computer system automatically manages the cleanup of former favorite bookmarks.

The bookmark system is part of an Internet Browser, which is one of the application programs 136, that enables the users of the personal computer 120 to access user identified Internet WEB site 149 without the need for further user input. This Browser system is generally available on personal computers although the following description of the multi-user capabilities represents a departure from the presently available bookmark feature of such Browser systems. The present multi-user Internet access and security system 200 comprises a plurality of password and memory management processes 201–207 that function to partition memory 210 into a plurality of domain spaces 211–215 for the storage of user bookmarks in a secure manner. The domain spaces 211–215 are typically a virtual partitioning of the memory space used by the bookmarks function and the password and memory management processes 201–207 are processes and/or scripts that are executable as part of the bookmarks feature of the Internet Browser application.

When a user first elects to create a bookmark, at step 301 the user accesses the Internet Browser in the application programs 136 and activates the bookmark function in well known fashion. The bookmark management process 201 at step 302 determines that the user is presently not assigned a domain space in memory 210. The bookmark management process 201 at step 303 activates a user qualification script to assign the user a selected domain space, such as 214. This process entails the creation at step 304 of a user-specific password process 204 that enables the user to view and access their bookmarks, as stored in domain space 214 to the exclusion of the other users of computer system 120. Once this user validation process is completed, at step 305 the bookmark management process 201 executes the user login script to enable the user to view and access the bookmarks. At step 306, the user inputs their user-specific password and process 204 validates the user's password at step 307 and enables the user to view and access their bookmarks B4.1–B4.5 which are stored in the user's domain space 214 at step 308. The bookmarks B4.1–B4.5 can be provisioned with login and password data to automate the user's access to a particular WEB site. This capability is especially relevant where the login and password script varies for the plurality of bookmarks that are stored for a particular user. The user then does not have to remember the various access scripts, since they are programmed into the computer system. The user simply clicks on the desired bookmark at step 309 and the computer system 120 automatically access the identified Internet WEB site at step 310 without the need for further user input.

The domain spaces can include shared domain space, such as domain space 213, wherein two users can access this shared domain space 213 and the bookmarks B3.1–B3.5 that are stored therein by executing their respective password processes 202, 203. In addition these two users can also have their private domain spaces 211, 212 that can be viewed and are accessible by the further execution of a second password process 205, 206, which can either be a separate password process from the password processes 202, 203 or can simply be a subprocess contained therein which manages the domain spaces 211, 212 as private domain spaces in conjunction with the shared domain space 213. Finally, there can be a common domain space 215 that is visible and accessible by all users without the need to execute a separate password process, such as the bookmarks that are provisioned on computer system 120 during manufacture or setup to enable simple access to desirable WEB sites, such as the computer system manufacturer's WEB site and the like.

In addition to the security of the bookmarks, the present multi-user Internet access and security system 200 can automatically manage bookmarks for the user. For example, using the bookmark architecture of FIG. 2 in a different context, assume that the domain space 211 is the "favorites" directory of bookmarks for the user. The favorites process 206 enables the user to access the bookmarks B1.1–B1.3 that are stored their by the user. However, existing bookmark systems maintain bookmarks B1.1–B1.3 as a static list and it is not uncommon for the list to grow to excessive size when the user does not expend the time to edit this list and delete the little used bookmarks. The user typically does not perform the editing process because all of the bookmarks may have some interest to the user and the use of the favorites directory is a convenient way to store the bookmarks for future possible use without having to maintain a separate file. The present multi-user Internet access and security system 200 includes a memory management process contained in bookmark management process 201 that maintains records of bookmark use in the favorites directory. Thus, at step 401, the bookmark management process 201 enters data into a data structure in response to a user accessing a one of their bookmarks that is stored in the favorites directory domain space 211. At step 402, on a periodic basis, bookmark management process 201 scans its data structure to identify the least frequently used bookmarks. The bookmark management process 201 can use any one or more of the well known cache management processes to regulate the number of bookmarks stored in the favorites directory. These cache management processes include: a fixed length list with the migration of the least used entry, migration of all entries which exceed a predetermined threshold time of last use, a fixed length list with the migration of the entry that has been unused for the greatest time, and the like. The process used identifies any bookmark entries that satisfy the bookmark management criteria and at step 403 the bookmark management process 201 migrates the identified bookmarks to a "former favorites" directory in domain space 212. Thus, the user still has access to the saved bookmarks, but the lesser used bookmarks B2.1–B2.3 are stored in a separate directory from the most commonly used bookmarks B1.1–B1.3. This simplifies the favorites list for the user without the loss of bookmarks that have been stored. Furthermore, when a bookmark is stored, it can be tagged as permanent to differentiate infrequently used bookmarks that should remain as favorites. The bookmark management process 201 can optionally periodically review at step 404 the contents of the former favorites directory and at step 405 expunge the bookmarks that meet further criteria that indicate the user is unlikely to use these bookmarks, due to extended periods of inactivity.

Summary

The multi-user Internet access and security system provides three improvements to the existing Internet Browser bookmark feature: a password protection capability for all of the bookmarks that are stored by the computer system for each of the users of the computer system, privacy from other users knowing what bookmarks are stored, and an optional automated management of the favorites category of bookmarks. These two features enhance the capabilities of the bookmark feature and provide multi-user computer systems with a capability that is presently absent from such systems.

What is claimed:

1. A bookmark system executing on a computer system, which is connectable to a network, for enabling each of a plurality of users to automatically address destinations that are accessible through said network, comprising:

memory means for storing a plurality of destination addresses, each of which identify a one of said plurality of predetermined destinations, for said plurality of users;

means for mapping said plurality of users to said plurality of destination addresses that are stored in said memory means to identify which of said plurality of users have authorization to access each of said plurality of destination addresses; and means for enabling each of said plurality of users to access only ones of said destination addresses that are mapped to said each of said plurality of users.

2. The bookmark system of claim 1 wherein said means for mapping comprises:

means for partitioning said memory means into a plurality of domain spaces, each of said domain spaces being accessible by at least one of said plurality of users, not all of said domain spaces being accessible by all of said plurality of users.

3. The bookmark system of claim 2 wherein said means for enabling comprises:

means for requiring each of said plurality of users to input at least one of a login and a password to access said domain space.

4. The bookmark system of claim 2 further comprising:

means for requiring each of said plurality of users to input a login to access said computer system; and means for requiring each of said plurality of users to input a password to access said domain space.

5. The bookmark system of claim 4 wherein said means for enabling comprises:

means for enabling a set of said plurality of users to access a particular one of said domain spaces via their respective individual passwords that are unique to a combination of said user in said set of users and said domain space.

6. The bookmark system of claim 1 further comprising:

means for storing a plurality of destination addresses for each of said users which are accessible via a favorites access process; and means for automatically migrating ones of said stored plurality of destination addresses, which are accessible via a favorites access process, to a secondary memory location, accessible via a second favorites access process, as a function of frequency of access by said users.

7. The bookmark system of claim 1 further comprising:

means for storing a plurality of destination addresses for each of said users, which addresses are accessible via a favorites access process; and means for tagging a one of said bookmarks to remain a favorite independent of the periodicity of access to this one of said bookmarks.

8. A method of operating a bookmark system executing on a computer system, which is connectable to a network, for enabling each of a plurality of users to automatically address destinations that are accessible through said network, comprising the steps of:

storing in a memory a plurality of destination addresses, each of which identify a one of said plurality of predetermined destinations, for said plurality of users;

mapping said plurality of users to said plurality of destination addresses that are stored in said memory to identify which of said plurality of users have authorization to access each of said plurality of destination addresses; and enabling each of said plurality of users to access only ones of said destination addresses that are mapped to said each of said plurality of users.

9. The method of operating a bookmark system of claim 8 wherein said step of mapping comprises:

partitioning said memory into a plurality of domain spaces, each of said domain spaces being accessible by at least one of said plurality of users, not all of said domain spaces being accessible by all of said plurality of users.

10. The method of operating a bookmark system of claim 9 wherein said step of enabling comprises:

requiring each of said plurality of users to input at least one of a login and a password to access said domain space.

11. The method of operating a bookmark system of claim 9 further comprising the steps of:

requiring each of said plurality of users to input a login to access said computer system; and requiring each of said plurality of users to input a password to access said domain space.

12. The method of operating a bookmark system of claim 11 wherein said step of enabling comprises:

enabling a set of said plurality of users to access a particular one of said domain spaces via their respective individual passwords that are unique to a combination of said user in said set of users and said domain space.

13. The method of operating a bookmark system of claim 8 further comprising the steps of:

storing a plurality of destination addresses for each of said users which are accessible via a favorites access process; and automatically migrating ones of said stored plurality of destination addresses, which are accessible via a favorites access process, to a secondary memory location, accessible via a second favorites access process, as a function of frequency of access by said users.

14. The method of operating a bookmark system of claim 8 further comprising the steps of:

storing a plurality of destination addresses for each of said users, which addresses are accessible via a favorites access process; and tagging a one of said bookmarks to remain a favorite independent of the periodicity of access to this one of said bookmarks.

15. A bookmark system executing on a computer system, which is connectable to a network, for enabling users to automatically address destinations that are accessible through said network, comprising:

memory means for storing a plurality of destination addresses, each of which identify a one of said plurality of predetermined destinations, for said users;

means for mapping said plurality of destination addresses that are stored in said memory means to a plurality of domain spaces;

means for storing a plurality of destination addresses for said users which are accessible via a favorites access process in a first of said plurality of domain spaces; and means for automatically migrating ones of said stored plurality of destination addresses, which are accessible via said favorites access process, to a second domain space, accessible via a second favorites access process, as a function of frequency of access by said users.

16. A method of operating a bookmark system executing on a computer system, which is connectable to a network, for enabling users to automatically address destinations that are accessible through said network, comprising the steps of:

storing in a memory a plurality of destination addresses, each of which identify a one of said plurality of predetermined destinations, for said users;

mapping said plurality of destination addresses that are stored in said memory to a plurality of domain spaces;

storing a plurality of destination addresses for said users which are accessible via a favorites access process in a first of said plurality of domain spaces; and automatically migrating ones of said stored plurality of destination addresses, which are accessible via said favorites access process, to a second domain space, accessible via a second favorites access process, as a function of frequency of access by said users.

* * * * *